(12) United States Patent
Matsui et al.

(10) Patent No.: US 6,894,817 B2
(45) Date of Patent: May 17, 2005

(54) OPTICAL DEFLECTION DEVICE AND PRODUCING METHOD THEREOF

(75) Inventors: Susumu Matsui, Hachioji (JP); Takahiro Ohkubo, Uenohara-machi (JP); Katsuji Sasaki, Sagamiko-machi (JP); Naohiro Ono, Hino (JP)

(73) Assignee: Konica Corporation, Tokyo (JP)

( * ) Notice: Subject to any disclaimer, the term of this patent is extended or adjusted under 35 U.S.C. 154(b) by 106 days.

(21) Appl. No.: 10/341,192

(22) Filed: Jan. 13, 2003

(65) Prior Publication Data

US 2003/0137709 A1 Jul. 24, 2003

(30) Foreign Application Priority Data

Jan. 21, 2002 (JP) ..................................... P2002-011526

(51) Int. Cl.$^7$ ............................................. G02B 26/08
(52) U.S. Cl. ..................................... 359/198; 310/67 R
(58) Field of Search ................................ 359/198, 200, 359/216, 217, 199; 310/90, 67 R

(56) References Cited

U.S. PATENT DOCUMENTS

| | | | |
|---|---|---|---|
| 5,963,353 A | 10/1999 | Shibuya et al. | |
| 6,310,711 B1 * | 10/2001 | Kobayashi et al. | ......... 359/216 |
| 6,421,157 B1 | 7/2002 | Matsui et al. | |

FOREIGN PATENT DOCUMENTS

| | | |
|---|---|---|
| EP | 1 031 867 A2 | 8/2000 |
| JP | 07-243437 | 9/1995 |
| JP | 07-259849 | 10/1995 |
| JP | 08-114219 | 5/1996 |
| JP | 08-121471 | 5/1996 |
| JP | 2001-154138 A | 6/2001 |
| JP | 2001-221972 A | 8/2001 |

* cited by examiner

Primary Examiner—Euncha P. Cherry
(74) Attorney, Agent, or Firm—Frishauf, Hotz, Goodman & Chick, P.C.

(57) ABSTRACT

An optical deflection device having: a rotor unit including a rotary polygon mirror having a plurality of mirror surfaces on the side surface portion and a holding member holding the polygon mirror; an air dynamic pressure bearing including a rotary bearing member to support the rotor unit and a fixed bearing member rotatably supporting the rotary member; and a stator unit which supports the fixed bearing member, including a winding coil oppositely arranged to the magnet, wherein prior to an assembly process, the adhesive agent layer is formed between the outer peripheral surface of the rotary bearing member and the inner peripheral surface of the holding member, the holding member and the rotary bearing member are set at the following condition, (the inner diameter of the holding member before the assembling)≧(the outer diameter of the rotary bearing member before the assembling).

5 Claims, 7 Drawing Sheets

OPTICAL DEFLECTION DEVICE AND PRODUCING METHOD THEREOF

BACKGROUND OF THE INVENTION

The present invention relates to a producing method of an optical deflection device provided in an image exposure device used for an image forming apparatus such as a laser beam printer, laser copier, and laser facsimile device.

In the image forming apparatus such as the laser beam printer, the laser light is made incident on a rotary polygon mirror (polygon mirror) which is rotated at an equal speed, based on the read-out information as a writing means of the image, and the reflected light is made to scan and is projected on the photoreceptor surface and the image recording is conducted.

When the polygon mirror is rotated at the low speed, it is directly fixed on a rotation axis of a drive motor, but when it is rotated at the high speed, the rotary polygon mirror is fixed on the outer cylindrical member and is rotated by using an air dynamic pressure bearing (air bearing) which is rotated in the floating status without touching the fixedly arranged inner cylindrical member. Further, because the air dynamic pressure bearing is rotated in the non-contact status, there are features such as a long life and low noise.

For the optical deflection device having the dynamic pressure bearing, the present applicant discloses the technology by each specification of Tokkaihei No. 7-243437, 7-259849, 8-114219 and 8-121471. The present applicant further discloses Tokkai 2001-221972 in which the inner peripheral surface of a polygon mirror and the outer peripheral surface of an outer cylindrical bearing are adhered together, and a flange member is adhered to either the outer peripheral surface of the outer cylindrical bearing or an end portion of the polygon mirror.

In the optical deflection device having: a rotor unit including a rotary polygon mirror having a plurality of mirror surfaces on the side surface portion and a holding member holding the polygon mirror; an air dynamic pressure bearing including a rotary bearing member to rotatably support the rotor unit and a fixed bearing member; and a stator unit which supports the fixed bearing member, including a winding coil which is oppositely arranged to the magnet, in the conventional assembly process in which the outer peripheral surface of the rotary bearing member and the inner peripheral surface of the holding member are fixed by the shrink-fit, it is necessary to increase the fixing strength that the shrink-fit margin (that is, the difference between the outer diameter of the rotary bearing member and the inner diameter of the holding member) is increased.

However, when the shrink-fit margin is increased, the inner diameter of the rotary bearing member changes. Particularly, when a portion of the outer peripheral surface of the rotary bearing member and the inner peripheral surface of the holding member are shrunk-fit and fixed, the inside stress of the rotary bearing member becomes non-uniform, and the inner peripheral surface of the rotary bearing member is inclined surface-like, and the rotation becomes unstable. Further, in the non-uniformity of the inside stress of the rotary bearing member, the inner peripheral surface of the rotary bearing member is deformed due to the change of the environmental temperature, and the unstable rotation is generated.

SUMMARY OF THE INVENTION

The object of the present invention is to solve the above-described problem in an optical deflection device and to provide a producing method of the optical deflection device by which the stable rotating performance is obtained.

The above object is attained by any one of the following structures (1)–(3).

(1) An optical deflection device having: a rotor unit including a rotary polygon mirror having a plurality of mirror surfaces on the side surface portion and a holding member holding the polygon mirror; an air dynamic pressure bearing including a rotary bearing member for supporting the rotor unit and a fixed bearing member for rotatably supporting the rotary bearing member; and a stator unit which supports the fixed bearing member, including a winding coil which is oppositely arranged to the magnet, wherein the optical deflection device is characterized in that prior to an assembly process in which the adhesive agent layer is formed between the outer peripheral surface of the rotary bearing member and the inner peripheral surface of the holding member and they are fixed, the holding member and the rotary bearing member are set at the following condition, (the inner diameter of the holding member before the assembly process)≧(the outer diameter of the rotary bearing member before the assembly process).

(2) An optical deflection device having: a rotor unit including a rotary polygon mirror having a plurality of mirror surfaces on the side surface portion and a holding member holding the polygon mirror; an air dynamic pressure bearing including a rotary bearing member for supporting the rotor unit and a fixed bearing member for rotatably supporting the rotary bearing member; and a stator unit which supports the fixed bearing member, including a winding coil oppositely arranged to the magnet, wherein the optical deflection device is characterized in that: prior to an assembly process, the adhesive agent layer is formed between the outer peripheral surface of the rotary bearing member and the inner peripheral surface of the holding member and they are fixed, the holding member and the rotary bearing member are set at the following conditions, (the inner diameter of the holding member before the assembly process)≧(the outer diameter of the rotary bearing member before the assembly process), and (the film thickness of the adhesive agent layer after the assembly process)>{(the inner diameter of the holding member before the assembly process)−(the outer diameter of the rotary bearing member before the assembly process)}×½.

(3) A producing method of the optical deflection device having: a rotor unit including a rotary polygon mirror having a plurality of mirror surfaces on the side surface portion and a holding member holding the polygon mirror; an air dynamic pressure bearing including a rotary bearing member to support the rotor unit and a fixed bearing member to rotatably support the rotary bearing member; and a stator unit which supports the fixed bearing member, including a winding coil oppositely arranged to the magnet, wherein the producing method of the optical deflection device is characterized in that: the inner diameter of the holding member and the outer diameter of the rotary bearing member are set at the following conditions, and the outer peripheral surface of the rotary bearing member on which the adhesive agent is coated, is inserted into the inner peripheral surface of the holding member which has been heated and they are fixed, (the inner diameter of the holding member before the assembly)≧(the outer diameter of the rotary bearing member before the assembly), and (the film thickness of the adhesive agent layer after the assembly)>{(the inner diameter of the holding member before the assembly)−(the outer diameter of the rotary bearing member before the assembly)}×½.

DETAILED DESCRIPTION OF THE PREFERRED EMBODIMENT (Image Forming Apparatus)

Before the description of the embodiment of a producing method of an optical deflection device of the present invention, the structure of a color copier as an example of an image forming apparatus in which a plurality of sets of the optical deflection devices are mounted will be described below.

(The Structure of the Image Forming Apparatus)

Figure 1:
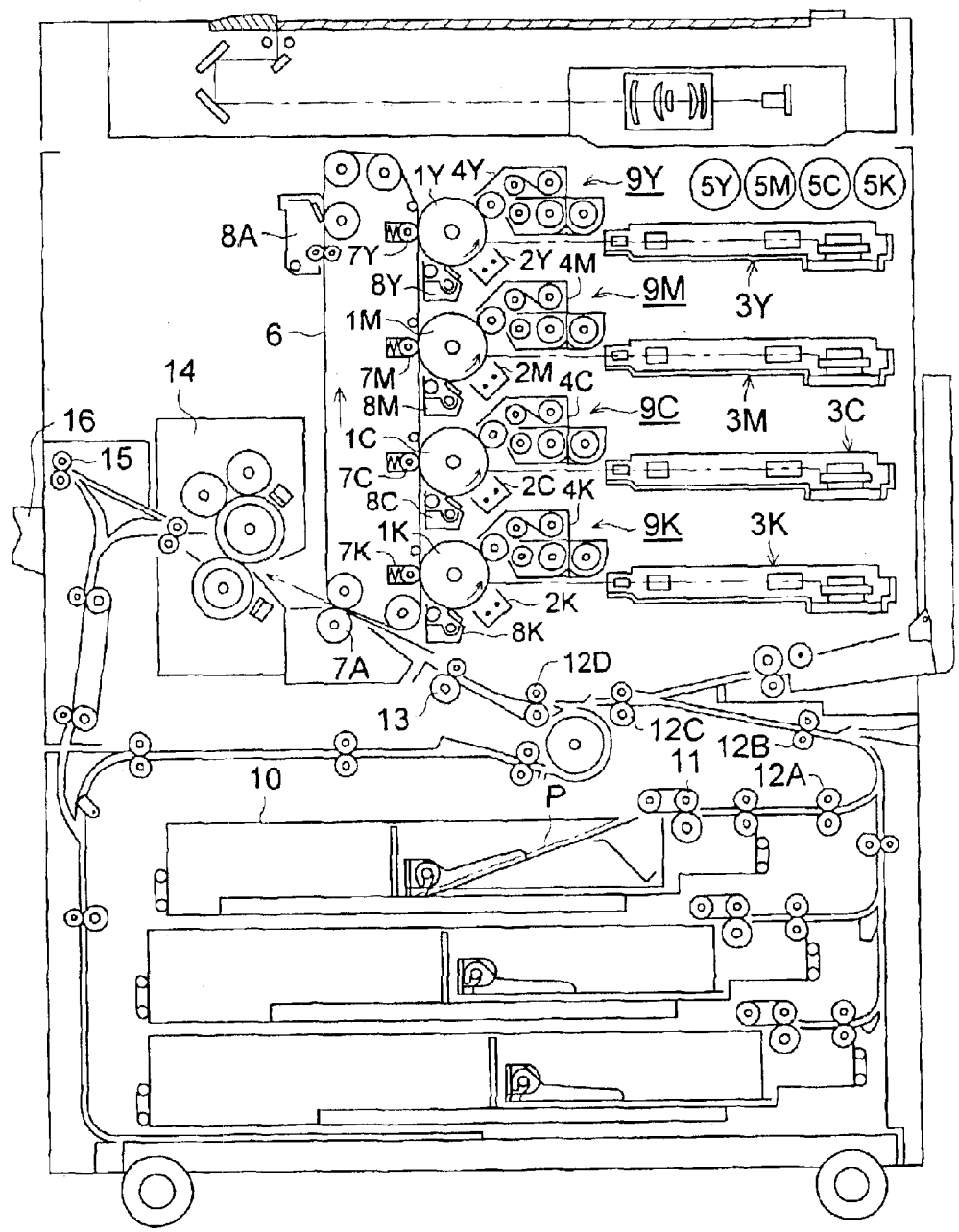
FIG. 1 is a structural view of a color copier.

FIG. 1 is a structural view of the color copier.

This image forming apparatus is called a tandem type color image forming apparatus, and is composed of plural sets of image forming sections 9Y, 9M, 9C, and 9K, a belt-like intermediate transfer body 6, a sheet feed conveying means and a fixing device 14.

The image forming section 9Y which forms a yellow image, has a charging means 2Y, image exposure device 3Y, developing device 4Y, and cleaning means 8Y, which are arranged on the periphery of the image carrier 1Y. The image forming section 9M forming a magenta image has the image carrier 1M, charging means 2M, image exposure device 3M, developing device 4M, and cleaning means 8M. The image forming section 9C forming the cyan image has the image carrier 1C, charging means 2C image exposure device 3C, developing device 4C, and cleaning means 8C. The image forming section 9K forming the black image has the image carrier 1K, charging means 2K, image exposure device 3K, developing device 4K, and cleaning means 8K.

The intermediate transfer body 6 is wound around a plurality of rollers and rotatably supported. Each color of images formed by the image forming sections 9Y, 9M, 9C, and 9K is successively transferred onto the rotating intermediate transfer body 6 by the primary transfer means 7Y, 7M, 7C and 7K, and the synthesized color image is formed. A transfer sheet P accommodated in a sheet feed cassette 10 is fed by a sheet feed means 11, and through the intermediate rollers 12A, 12B, 12C, 12D, and registration roller 13, it is conveyed to the secondary transfer means 7A, and a color image is transferred onto the transfer sheet P. The transfer sheet P on which the color image is transferred is fixing processed by a fixing device 14, and nipped by a delivery sheet roller 15, and placed on the delivery sheet tray 16 outside the image forming apparatus.

On the one hand, after the color image is transferred onto the transfer sheet P by the secondary transfer means 7A, the residual toner on the intermediate transfer body 6 from which the transfer sheet P is separated, is removed by the cleaning means 8A.

The 5Y, 5M, 5C, 5K are toner replenishing means by which the new toners are respectively replenished to the developing devices 4Y, 4M, 4C and 4K.

(Image Exposure Device)

In the image forming apparatus such as the laser printer, as the writing means of the image, on the base of the read-out information, the laser beam is made incident on the rotary polygon mirror (polygon mirror) which is rotated at the equal speed, and the reflected light is made to scan and is projected onto the photoreceptor surface of the image carrier 1, and the image recording is conducted.

Figure 2:
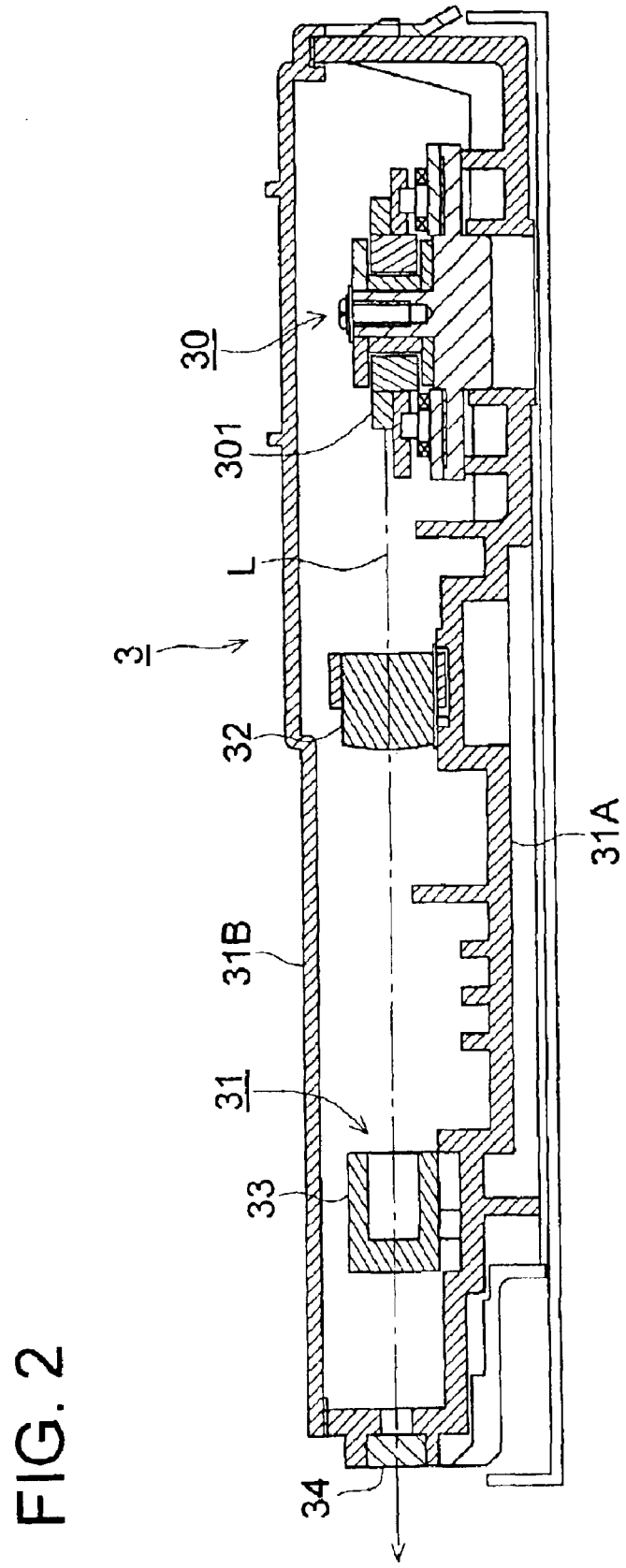
FIG. 2 is a sectional view showing an embodiment of an image exposure device.
Figure 3:
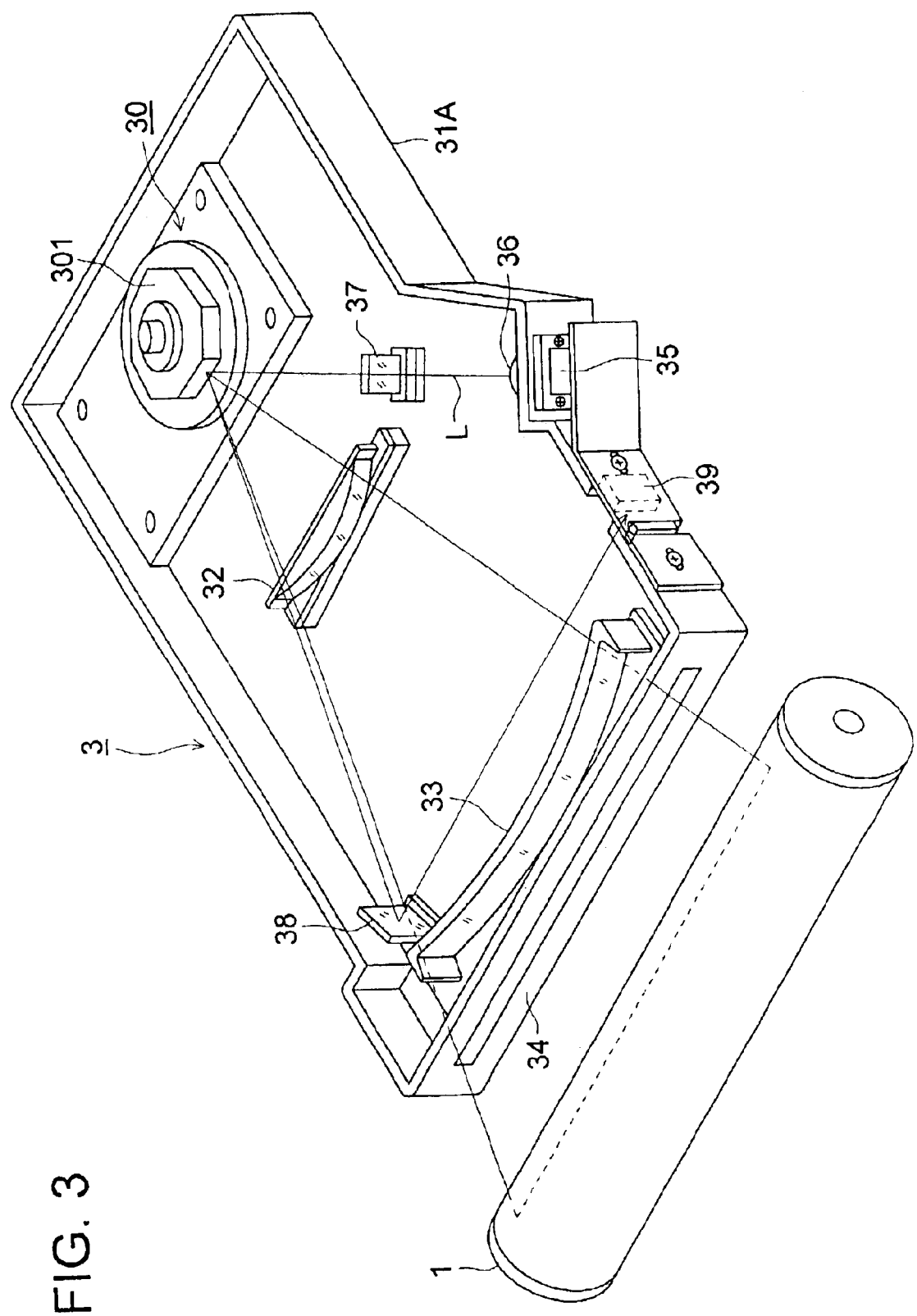
FIG. 3 is a perspective view of the image exposure device.
Figure 4:
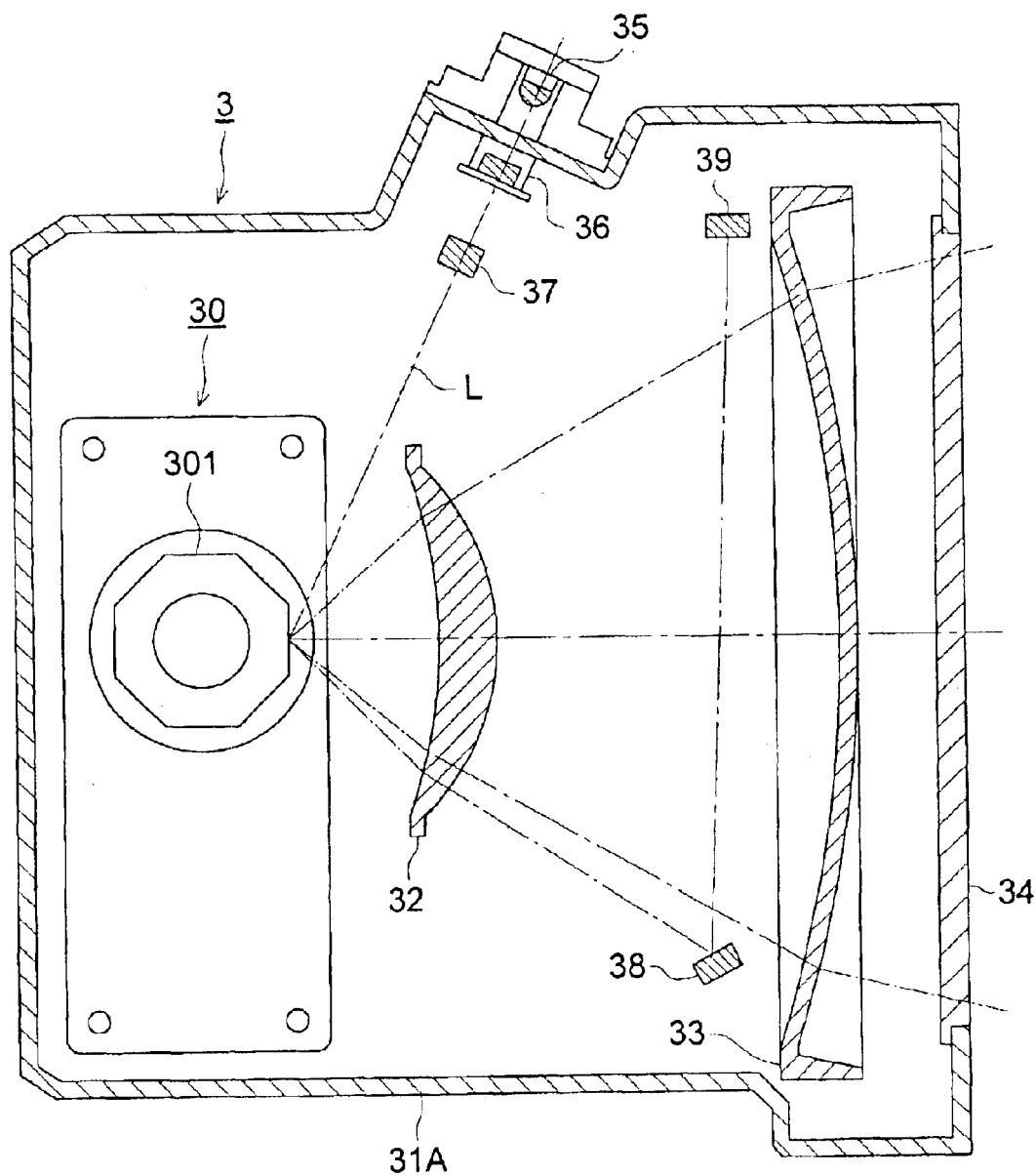
FIG. 4 is a plan view of the image exposure device.

FIG. 2 is a sectional view showing an embodiment of the image exposure device, and FIG. 3 is a perspective view of the image exposure device 3, and FIG. 4 is a plan view of the image exposure device 3.

The image exposure device 3 is composed of an optical deflection device 30 and scanning optical system 31. Hereinafter, the image carriers 1Y, 1M, 1C and 1K in the color printer are called the image carrier 1, and the image exposure devices 3Y, 3M, 3C and 3K are called the image exposure device (writing device) 3, each optical deflection device of the image exposure devices 3Y, 3M, 3C and 3K is called the optical deflection device 30, and each scanning optical system of the image exposure devices 3Y, 3M, 3C and 3K is called the scanning optical system 31.

The scanning optical system 31 is composed of an optical main body 31A, cover body 31B, fθ lens 32, the second cylindrical lens 33, cover glass 34, semiconductor laser (light source section) 35, collimator lens 36, the first cylindrical lens 37, index mirror 38 for the timing detection, and index sensor 39 for the synchronization detection.

The optical deflection device 30 composed of the rotary polygon mirror (polygon mirror) 301, and optical members 32–39 of the scanning optical system 31, are arranged and fixed at a predetermined position in the optical main body 31A.

The laser beam (light flux) L emitted from the semiconductor laser 35, becomes a parallel light by the collimator lens. 36, and next, passes the first cylindrical lens 37 of the first image formation optical system, and is incident on the rotary polygon mirror (polygon mirror) 301 of the optical deflection device 30. The reflected light of the rotary polygon mirror 301 passes the second image formation optical system composed of the fθ lens 32 and the second cylindrical lens 33, and passes the cover glass 34, and on the peripheral surface of the image carrier 1, scans by a predetermined spot diameter in the condition that a predetermined pitches are shifted in the sub-scanning direction. In this condition, the main-scanning direction is finely adjusted already by an adjustment mechanism (not shown). The synchronization detection for each one line, is conducted in such a manner that the laser beam (light flux) L before the scanning start is made incident on the index sensor 39 through the index mirror 38.

(Optical Deflection Device)

Figure 5:
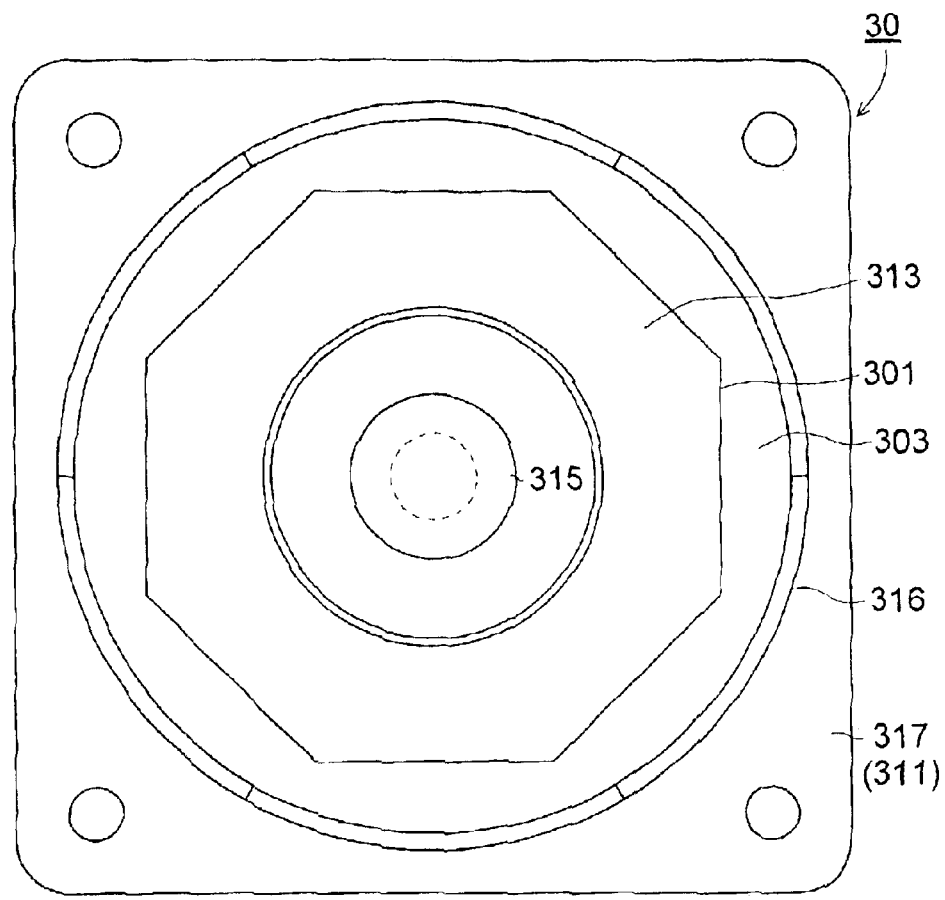
FIGS. 5(a) and 5(b) are a plan view and sectional view of an optical deflection device.
Figure 5:
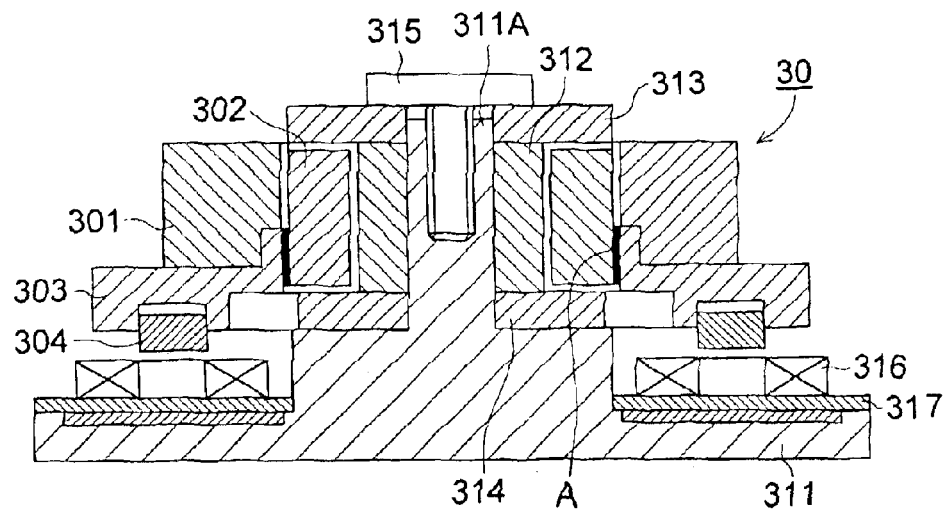
Figure 6:
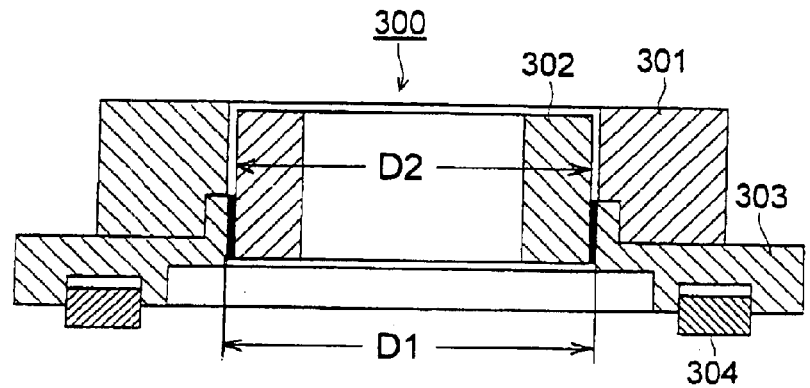
FIGS. 6(a) and 6(b) are exploded sectional views of the optical deflection device.
Figure 6:
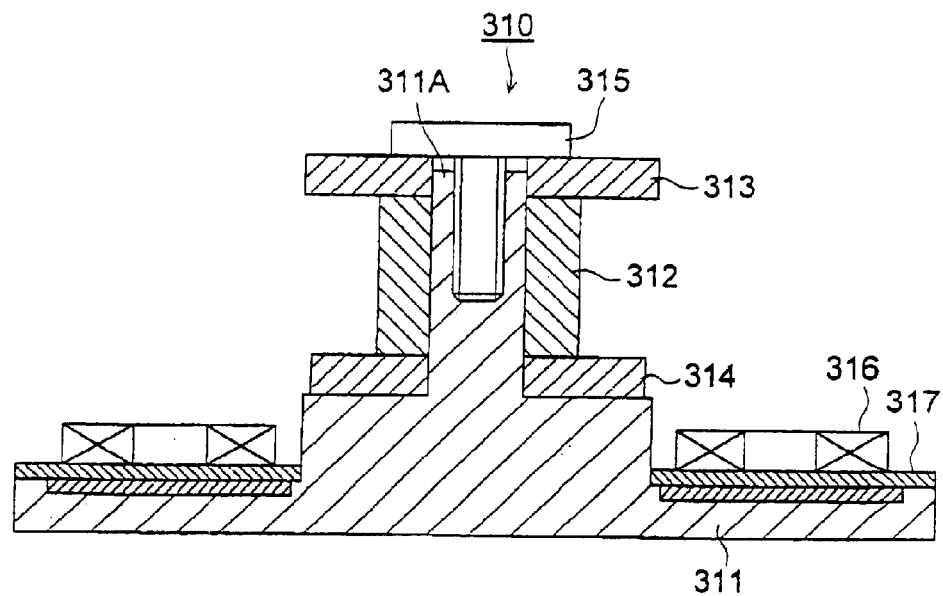

FIG. 5(a) is a plan view of the optical deflection device 30, and FIG. 5(b) is a sectional view of the optical deflection device 30. FIGS. 6(a) and 6(b) show exploded sectional views of the optical deflection device 30, and FIG. 6(a) is a sectional view of a rotor unit 300, and FIG. 6(b) is a sectional view of a stator unit 310.

In the optical deflection device 30 by which the rotary polygon mirror 301 is rotated as a rotation body at the high speed, an air dynamic pressure bearing is provided between the rotor unit (rotor) 300 which is a rotation body, and the stator unit (stator) 310 which is a no-rotation body, and the equal speed rotation is conducted (refer to FIGS. 6(a) and 6(b)). Outside the column shaped radial shaft section 311A which is erected on a support base member 311, a cylindrical fixed bearing member (hereinafter, called also inner cylindrical member) 312 is fixedly provided, and the radial fixed section is structured by the radial shaft section 311A and the inner cylindrical member 312.

On both-side end portions of the inner cylindrical member 312, in almost vertical direction of the radial shaft section 311A, the disk-shaped upper thrust fixed member (hereinafter, called upper thrust plate) 313 and the lower thrust fixed member (hereinafter, called lower thrust plate) 314 are fixedly provided, and the thrust fixed portion is structured. The inner cylindrical member 312, upper thrust plate 313, and lower thrust plate 314 are fixed by the screw 315 after they are mounted on the radial shaft section 311A.

On the flat surface portion of the support base member 311, a printed board 317 on which a plurality of winding coils 316 are arranged on the same surface, is attached.

The above-described support base member 311, inner cylindrical member 312, upper thrust plate 313, lower thrust plate 314, winding coil 316 and printed board 317 are integrated, and form the stator unit 310.

On the one hand, in the rotor unit 300 which is a unit to rotate the optical deflection device 30 at an equal speed, the cylindrical rotary bearing member (hereinafter, called also outer cylindrical member) 302 around the rotating axis is integrally provided. The inner diameter of the outer cylindrical member 302 is larger than the outer diameter of the inner cylindrical member 312 by an adjusted fine interval of several $\mu$ms. By the inner peripheral surface of this outer cylindrical member 302 and the outer peripheral surface of the inner cylindrical member 312, the radial dynamic pressure bearing section is structured.

Further, the upper end surface of the outer cylindrical member 302 is opposite to the thrust surface of the upper thrust plate 313, and structures the upper thrust dynamic pressure bearing section. In the same manner, the lower end surface of the outer cylindrical member 302 is opposite to the thrust surface of the lower thrust plate 314, and structures the lower thrust dynamic pressure bearing section. The air dynamic pressure bearing is structured by the above-described radial dynamic pressure bearing section, upper thrust dynamic pressure bearing section, and the lower thrust dynamic pressure bearing section.

The inner cylindrical member 312 structuring the air dynamic pressure bearing, outer cylindrical member 302, upper thrust plate 313, and lower thrust plate 314 are formed of ceramic such as alumina or silicon nitride, or metallic material such as stainless steel, aluminum or brass, or metallic material which is galvanizing processed or resin coated.

In the optical deflection device 30, the holding member (flange member) 303 is fixed on the outer peripheral surface of the outer cylindrical member 302 in such a manner that the inner diameter (diameter) D1 of the holding member 303 before the assembly, outer diameter (diameter) D2 of the outer cylindrical member 302 before the assembly, and the film thickness A of the adhesive agent layer satisfy $D1 \geq D2$, and $A > (D1-D2) \times \frac{1}{2}$, and the rotary polygon mirror 301 whose outside surface is a mirror surface is adjusted so that the center of the rotary polygon mirror 301 coincides with the rotation center of the rotor unit 300, and attached onto the holding member 303. The holding member 303 is formed of the metallic material such as the stainless steel, aluminum, or brass.

On the lower end surface of the holding member 303, a magnet 304 for the torque generation which is formed like a ring with the multi-pole pairs is fixed.

(The Producing Method of the Optical Deflection Device)

Figure 7:
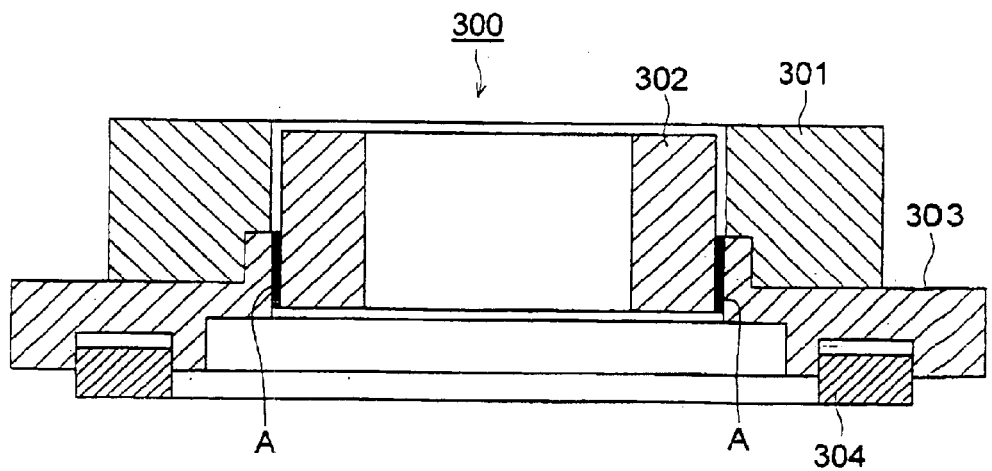
FIG. 7 is an enlarged sectional view of a rotor unit.

FIG. 7 is an enlarged sectional view of the rotor unit 300.

An assembly process of the rotor unit 300 will be shown below.

(1) The inner diameter D1 of the holding member 303 before the assembly and the outer diameter D2 of the outer cylindrical member 302 before the assembly are measured, and the inner diameter (diameter) D1 and the outer diameter (diameter) D2 and the film thickness A of the adhesive agent layer after the assembly are selected so that they satisfy the expressions of $D1 \geq D2$.

(2) On the outer peripheral surface of the outer cylindrical member 302, the adhesive agent is uniformly coated. As the adhesive agent, the anaerobic acrylic resin, for example, 648UV made by LOCTITE Co. is used.

(3) The holding member 303 is heated at the high temperature (for example, about 180° C.), and the inner diameter D1 of the holding member 303 is increased, and inserted on the outer peripheral surface of the outer cylindrical member 302.

(4) After the assembly, the adhesive agent is hardened at soon, and the condition of $A > (D1-D2) \times \frac{1}{2}$ is achieved. Then, the temperature of the holding member 303 is lowered from the high temperature to the normal temperature, and the inner diameter D1 of the holding member 303 is reduced, and the outer peripheral surface of the outer cylindrical member 302 is tightened by the holding member 303, and becomes the fixed condition.

(5) The adhesive agent protruded up and down the adhesive section of the holding member 303 and outer cylindrical member 302 is hardened by the UV light irradiation.

(6) The rotary polygon mirror 301 is fixed on the holding member 303, and the assembly process of the rotor unit 300 is completed.

(The Inner Diameter Change of the Outer Cylindrical Member 302 After the Assembly of the Rotor Unit 300)

Figure 8:
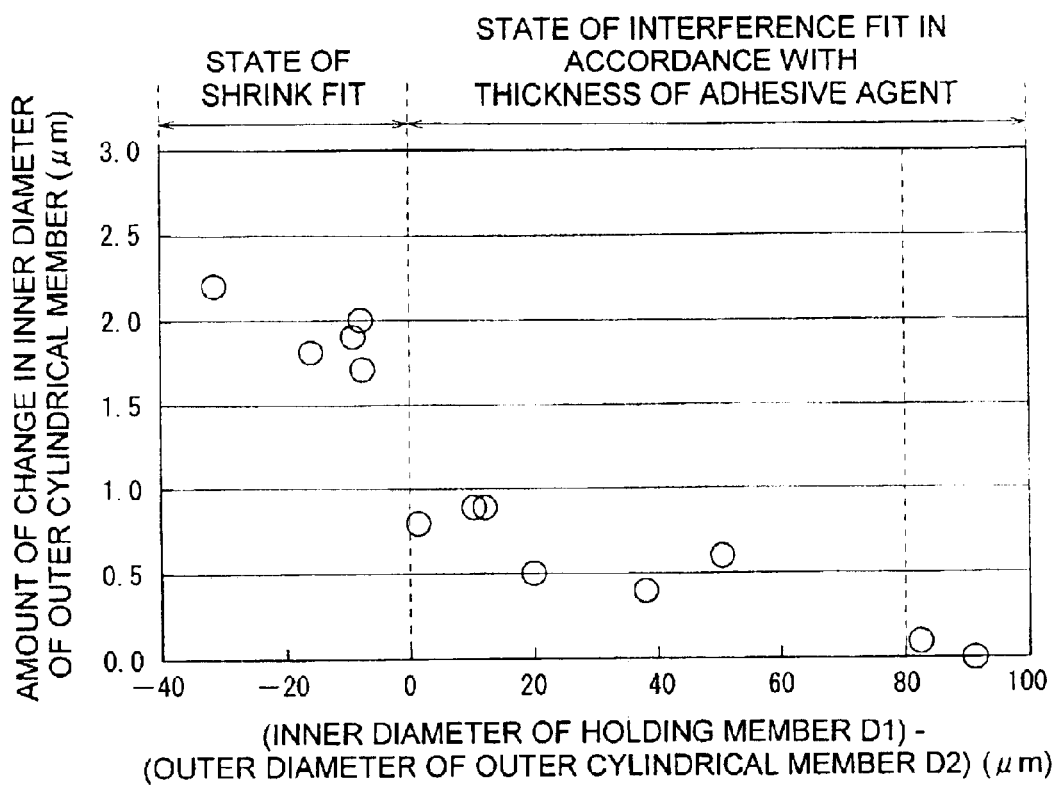
FIG. 8 is a characteristic view showing the correlation among the inner diameter of the holding member before the assembly, the difference of the outer diameter of an outer cylindrical member, and the changing amount of the inner diameter of the outer cylindrical member.

FIG. 8 is a characteristic view showing the correlation among the inner diameter D1 of the holding member 303 before the assembly, the difference $\delta$ of the outer diameter D2 of the outer cylindrical member 302, and the inner diameter changing amount of the outer cylindrical member 302.

In order to stably rotate the rotor unit 300, it is necessary that the inner diameter changing amount of each portion of the outer cylindrical member 302 after the assembly is not larger than 1.0 $\mu$m, and in order to satisfy that, the difference $\delta$ between the inner diameter D1 of the holding member 303 before the assembly, and the outer diameter D2 of the outer cylindrical member 302, is not smaller than 0 $\mu$m.

When the difference $\delta$ between the inner diameter D1 of the holding member 303 and the outer diameter D2 of the outer cylindrical member 302, is not smaller than 80 $\mu$m, the strength is insufficient at the time of high temperature, and when the external force of 10 kgf is added at 80° C., the shaft slippage is generated, and it is not practically durable.

Accordingly, when the difference $\delta$ is set to $80 \mu m \geq (D1-D2) \geq 0 \mu m$, the rotor unit 300 can be stably rotated.

In this connection, the present invention is not limited to the above-described embodiment. That is, within the scope without departing from the spirit of the present invention, the present invention is applied in the same manner by variously modifying also for the high speed rotation device, and optical deflection device.

The producing method of the optical deflection device of the present invention has the effects which will be described below.

(1) As compared to the conventional producing method by which the inner diameter of the holding member before the assembly is processed smaller than the outer diameter of the outer cylindrical member, and shrunk fit to it, or as compared to the conventional processing method in which this shrink-fit and adhesive agent are jointly used, according to the producing method of the present invention, the internal stress of the outer cylindrical member is small, the distortion of the inner diameter is very small, and the stable equal speed rotation is attained.

(2) When the holding member is heated and expanded, the gap between the inner diameter of the holding member and the outer diameter of the outer cylindrical member is increased, and the operability is increased.

(3) When it is in the interference-fit condition by the film thickness of the adhesive agent after the assembly, the enough strength is maintained also at the time of high temperature.

(4) When it is set at (the inner diameter of the holding member before the assembly)≧(the outer diameter of the rotary bearing member before the assembly), and (the film thickness of the adhesive agent layer after the assembly)>{(the inner diameter of the holding member before the assembly)−(the outer diameter of the rotary bearing member before the assembly)}×½, the enough strength is maintained also at the time of high temperature, and the gap between the inner diameter of the holding member and the outer diameter of the outer cylindrical member is increased, and the operability is increased. Further, the hardening of the adhesive agent is accelerated by the heat of the holding member, and the production efficiency is increased.

(5) The inner diameter distortion of the outer cylindrical member is prevented, and the tightening strength of the outer cylindrical member and the holding member is secured.

What is claimed is:

1. An optical deflection device comprising:
    (a) a rotor unit including a magnet, a rotary polygon mirror having a plurality of mirror surfaces on a side surface portion thereof, and a holding member for holding the polygon mirror and the magnet;
    (b) an air dynamic pressure bearing having a rotary bearing member to be fixed to the rotor unit through the holding member and a fixed bearing member for rotatably supporting the rotary bearing member by air dynamic pressure; and
    (c) a stator unit which supports the fixed bearing member, and which has a winding coil arranged opposite to the magnet for driving the rotor unit,
    wherein before a process of assembling and fixing the rotary bearing member to the holding member, an adhesive layer is formed between an outer peripheral surface of the rotary bearing member and an inner peripheral surface of the holding member, and
    wherein an inner diameter of the holding member before the assembling process is greater than or equal to an outer diameter of the rotary bearing member before the assembling process.

2. The optical deflection device of claim 1, wherein in the process of assembling and fixing the rotary bearing member to the holding member, the holding member is heated and the rotary bearing member is inserted into the holding member such that the outer peripheral surface of the rotary bearing member, on which the adhesive has been formed, is fixed to the inner peripheral surface of the holding member which has been heated.

3. The optical deflection device of claim 1, wherein
    a thickness of the adhesive layer after the assembling process is greater than one half of a difference between the inner diameter of the holding member before the assembling process and the outer diameter of the rotary bearing member before the assembling process.

4. The optical deflection device of claim 1, wherein
    a difference between the inner diameter of the holding member before the assembling process and the outer diameter of the rotary bearing member before the assembling process is less than or equal to 80 $\mu$m and greater than or equal to 0 $\mu$m.

5. A method of producing an optical deflection device that comprises: (a) a rotor unit including a magnet, a rotary polygon mirror having a plurality of mirror surfaces on a side surface portion thereof, and a holding member for holding the polygon mirror and the magnet; (b) an air dynamic pressure bearing having a rotary bearing member to be fixed to the rotor unit through the holding member and a fixed bearing member for rotatably supporting the rotary bearing member by air dynamic pressure; and (c) a stator unit which supports the fixed bearing member, and which has a winding coil arranged opposite to the magnet for driving the rotor unit, said method comprising:
    coating an adhesive on an outer peripheral surface of the rotary bearing member;
    heating the holding member; and
    inserting the rotary bearing member into the holding member such that the outer peripheral surface of the rotary bearing member is fixed to an inner peripheral surface of the holding member;
    wherein an inner diameter of the holding member before inserting the rotary bearing member into the holding member is greater than or equal to an outer diameter of the rotary bearing member before inserting the rotary bearing member into the holding member; and
    wherein a thickness of the adhesive after inserting the rotary bearing member into the holding member is greater than one half of a difference between the inner diameter of the holding member before inserting the rotary bearing member into the holding member and the outer diameter of the rotary bearing member before the rotary bearing member into the holding member.

* * * * *